(No Model.) 2 Sheets—Sheet 1.
W. L. CASADAY.
JOINTED PLOW TONGUE.
No. 252,866. Patented Jan. 31, 1882.
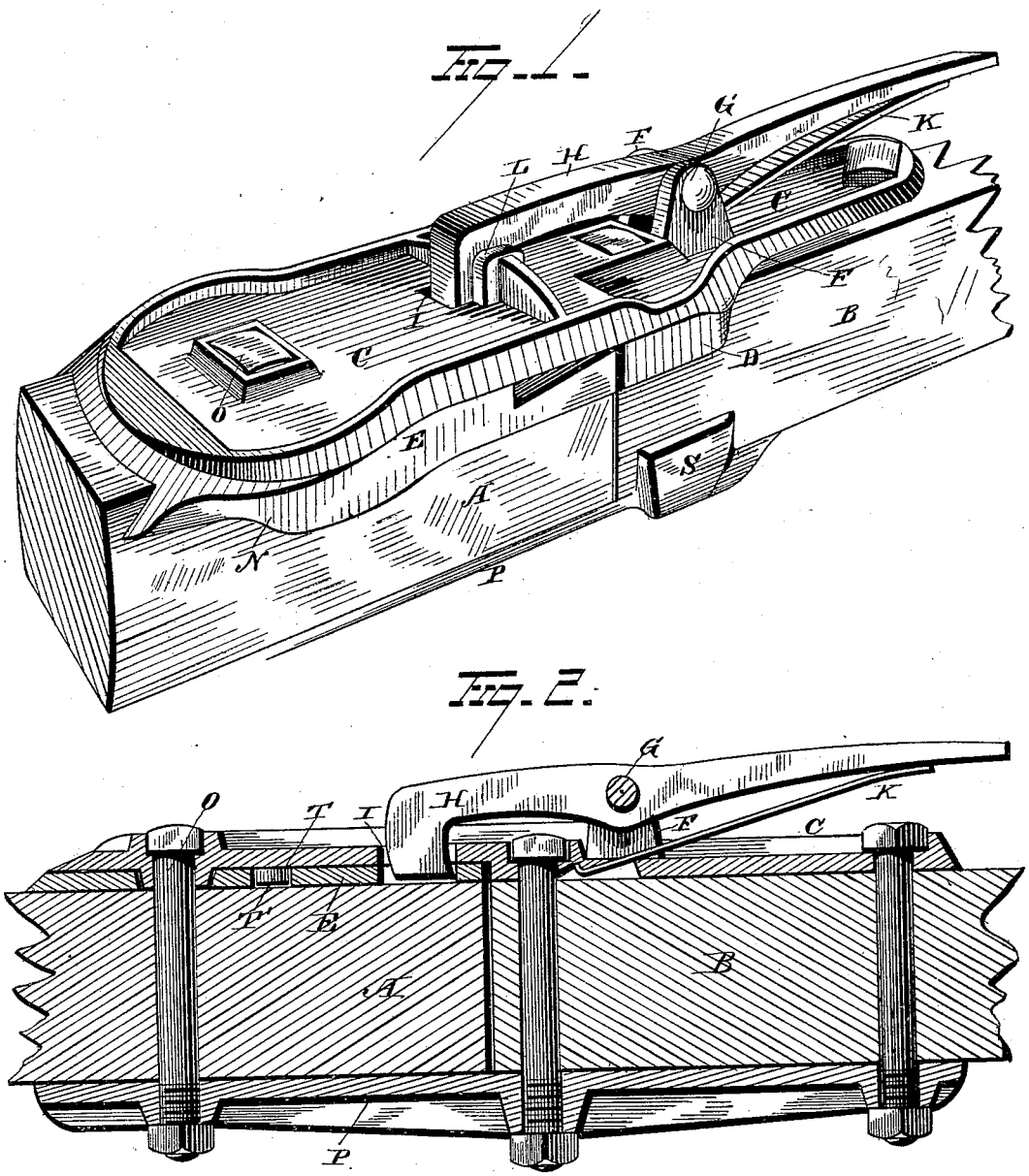
WITNESSES
INVENTOR
Wm L Casaday
By H A Symons
ATTORNEY (No Model.) 2 Sheets—Sheet 2.
W. L. CASADAY.
JOINTED PLOW TONGUE.
No. 252,866. Patented Jan. 31, 1882.
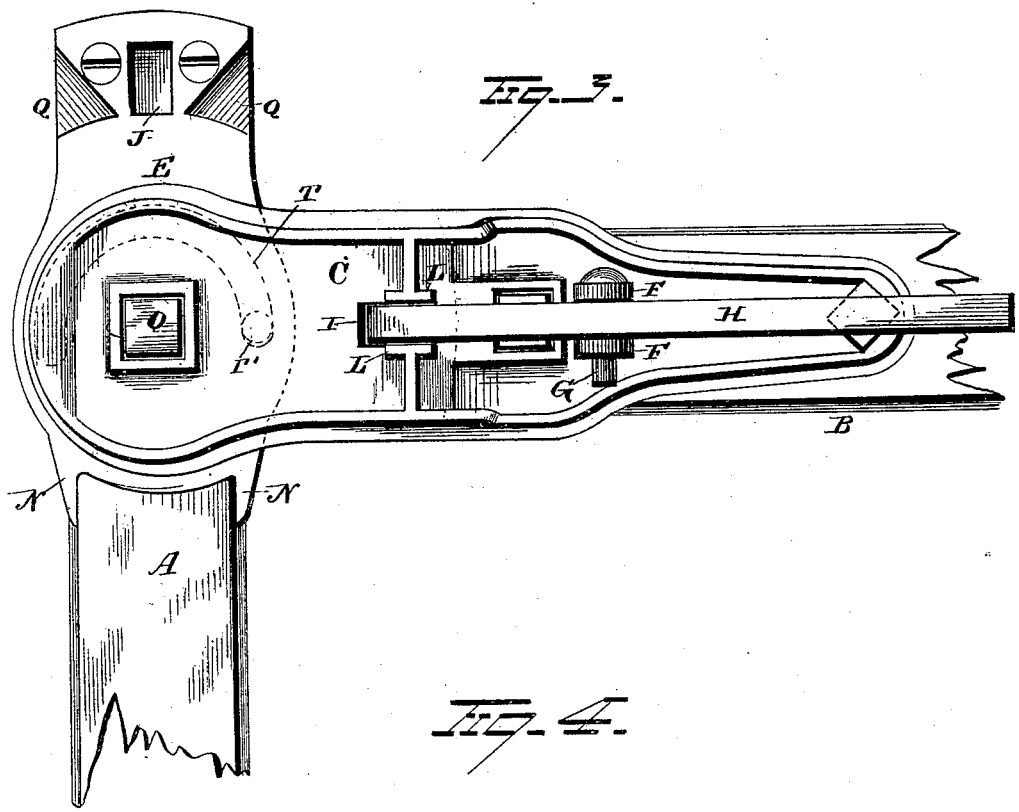
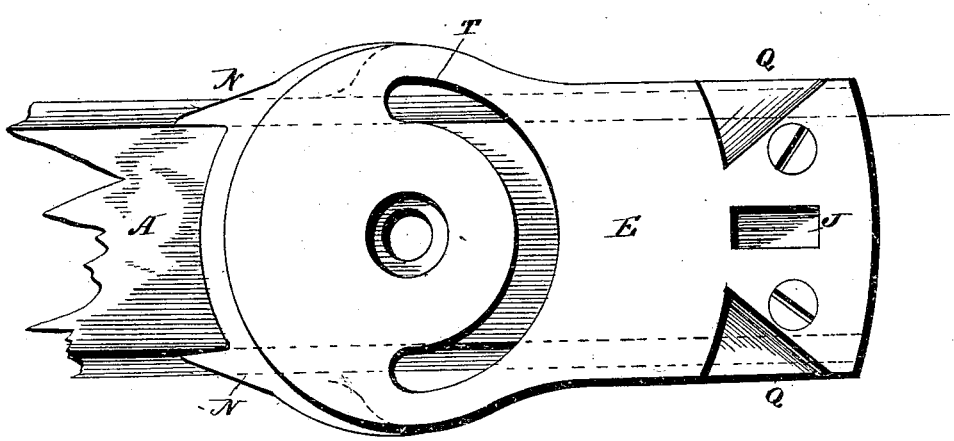
WITNESSES
E. I. Nottingham
Herman Moran
INVENTOR
Wm L. Casaday
By H. A. Seymour
ATTORNEY

UNITED STATES PATENT OFFICE.

WILLIAM L. CASADAY, OF SOUTH BEND, INDIANA.

JOINTED PLOW-TONGUE.

SPECIFICATION forming part of Letters Patent No. 252,866, dated January 31, 1882.

Application filed November 15, 1881. (No model.)

*To all whom it may concern:*

Be it known that I, WILLIAM L. CASADAY, of South Bend, in the county of St. Joseph and State of Indiana, have invented certain new and useful Improvements in Jointed Plow-Tongues; and I do hereby declare the following to be a full, clear, and exact description of the invention, such as will enable others skilled in the art to which it pertains to make and use the same.

My invention relates to an improvement in jointed plow-tongues, the object being to enable the plow to be turned in its furrow by the draft of the team, instead of being crowded around, as it must be when it is in attachment with an inflexible tongue.

A further object of my invention is to produce a jointed plow-tongue which shall combine simplicity and cheapness of construction with durability in use, and which shall be adapted to be easily operated by the plowman and to be turned to a full right angle with the plow without interfering with or straining it.

With these objects in view my invention consists in certain details of construction and combinations of parts, as will be hereinafter described, and pointed out in the claims.

In the accompanying drawings, Figure 1 is a view in perspective of a jointed plow-tongue constructed in accordance with my invention. Fig. 2 is a view thereof in vertical longitudinal section. Fig. 3 is a plan view of the improvement, showing the tongue-sections at right angles to each other; and Fig. 4 is a plan view of the slotted plate, which is saddled upon the top of the outer section of the plow-tongue.

A and B respectively represent the outer and inner sections of a jointed plow-tongue. A plate, C, provided with downwardly-projecting flanges D, adapted to clasp the outer ends of the section B of the plow-tongue, is securely bolted thereto. The outer end of the said plate projects beyond the end of the section B, and has bearing upon a slotted plate, E, saddled upon the inner end of the section A. Vertical lugs F, made integral with and rising from the rear half of the plate C, are adapted to receive the pivot G, which constitutes the fulcrum of the pivotal spring-pressed dog H. The forward end of the said dog is bent downward at a right angle, and is adapted to pass through a suitable aperture, I, in the plate C and enter a slot, J, formed in the plate E. The other end of the dog extends rearwardly in position to be readily reached and depressed by the foot of the plowman. Normally the two sections of the plow-tongue are rigidly locked together by the engagement of the angled end of the dog with the slot J of the plate E. This adjustment is sustained by a spring, K, which exerts a constant pressure on the rear end of the dog, tending to force it upward. Vertical guides L, located on opposite sides of the aperture I of the plate C, prevent the angled end of the dog from being thrown beyond the range of the said aperture.

The plate E is provided with flanges N, which extend throughout its length, and which serve to insure it a firm seat upon the end or section A of the plow-tongue. The aperture J, before alluded to, bisects a segment of the circle which the inner end of section A describes as it is turned upon the bolt O, which secures it between the plate C and the plate P, secured to the under face of the section B. Bevels Q, following the path of the said circle, rise from each edge of the plate E toward the slot J. They are designed, by acting as cams, to render the locking of the plow-tongue, when the two sections are brought in a right line, automatic.

The plate P, secured to the lower face of the section B and projecting beyond it, is provided with upwardly-extending flanges S, which clasp the sides of the said section, thereby enabling the plate the better to resist any lateral strain that may be put upon it. The outer end of the plate C and the plate E are provided with wide bearing-faces to relieve the bolt O from as much strain as possible. The plate E is provided with a segmental slot, T, into which projects a stud, T', on the under side of the plate C, and serves to limit the movement of the forward or hinged section of the tongue.

Having thus described the construction of my improvements, I will now briefly describe the mode of its use.

When the plowman desires to turn his plow in the furrow for the purpose of changing the direction thereof, he depresses the rearwardly-extending end of the dog with his foot. This will effect the elevation of its outer end and its withdrawal from the slot J. The team is now virtually disengaged from the plow, and can be faced in the direction desired and started forward. The result will be that the plow will be abruptly turned in the furrow by the draft of the team alone and without that pushing and crowding which always occur when a plow with an inflexible tongue is turned. As soon as the plow is turned sufficiently to bring the rear section of the tongue nearly into a right line with the forward section thereof, the dog will be raised by one of the bevels Q, and the automatic locking of the two sections of the tongue will result the moment they are parallel with each other.

My improvement, as will be seen from the foregoing, is very simple in construction and very easily operated. Its position gives an unusually wide field of movement to the team, and its independence of the plow avoids all interference therewith and strain thereon.

I am aware that it is old to pivot or hinge the tongue to the upper side of the plow-beam or the frame, and provide means whereby the tongue may be rigidly locked to such parts, and also released, so that the tongue may be swung around in either direction, and hence I make no claim to such construction or arrangement of parts.

Having fully described my invention, what I claim as new, and desire to secure by Letters Patent, is—

1. The combination, with the two sections A B of a plow-tongue, of the metal plates C P, for securing said sections together, the plate E, provided with the beveled portions Q and slot J, and spring-dog H, substantially as set forth.

2. The combination, with the plow-tongue sections A B, placed end to end, and metal plates C P, for connecting said sections, of the plate E, provided with the arc-shaped slot T and pin or stud T', for limiting the movement of the pivoted tongue-section, substantially as set forth.

3. The combination, with the plow-tongue sections A B, placed end to end, and plates C P, for securing said sections together, of the plate E, provided with slot J, the dog H, and the guide-flanges L L, formed on plate C, and adapted to relieve the dog of lateral strain, substantially as set forth.

In testimony whereof I have signed this specification in the presence of two subscribing witnesses.

WILLIAM L. CASADAY.

Witnesses:
F. C. NIPPOLD,
C. R. STICKNEY.